Feb. 6, 1951   J. D. COBINE   2,540,811
INERT GAS ARC WELDING ELECTRODE
Filed March 30, 1950
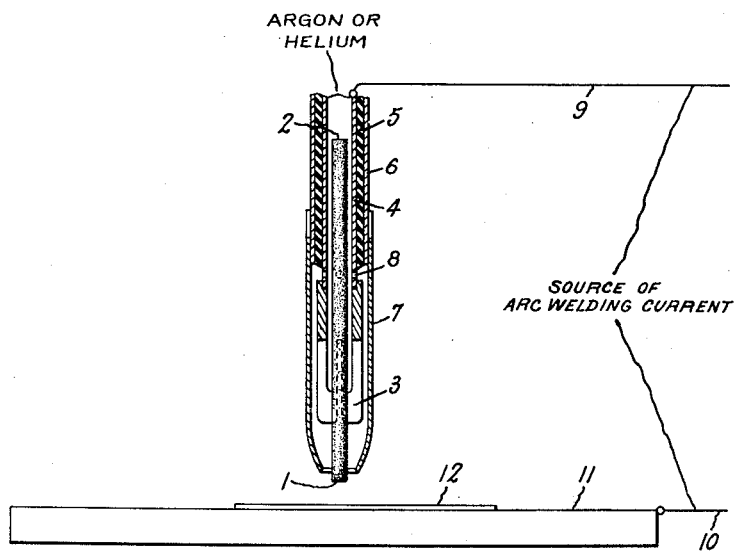
Inventor:
James D. Cobine,
by Paul A. Frank
His Attorney.

Patented Feb. 6, 1951

2,540,811

UNITED STATES PATENT OFFICE 2,540,811

INERT GAS ARC WELDING ELECTRODE

James D. Cobine, Schenectady, N. Y., assignor to General Electric Company, a corporation of New York Application March 30, 1950, Serial No. 152,974

4 Claims. (Cl. 219—8)

This invention relates to inert gas-shielded arc welding. More particularly, it relates to an improved non-consumable electrode for inert gas-shielded arc welding and the process of making such electrode.

Tungsten fabricated into a suitable form, such as a rod, is often employed as an electrode in inert gas-shielded arc welding using gases such as argon and helium. However, in using plain tungsten as an electrode in such welding, it is usually very difficult to start the cathode spot and arc using the conventional high frequency spark or a carbon arc-starting piece. Furthermore, once established the cathode spot and arc wander over the surface of the electrode tip and up the side of the electrode, extinguishing the arc, causing erratic, defective and interrupted welds and damaging the welding apparatus. This instability of the welding arc has been a distinct disadvantage particularly in automatic arc welding and especially so when direct current is used with the electrode negative.

An object of this invention is to provide inert gas-shielded electric arc welding apparatus employing an electrode which permits instant starting of a stable arc at low currents.

Another object of the invention is to provide an inert gas-shielded arc welding electrode which will start instantly at low open circuit generator voltages.

It is a further object of the present invention to provide an electrode for inert gas-shielded electric arc welding which maintains a steady, stable and non-wandering arc.

Other objects will become apparent from a consideration of the following description and the drawing in which the single figure shows conventionally an inert gas-shielded arc welding torch in section having an electrode as set forth herein.

It has been found that when certain materials are used in conjunction with the tungsten electrode, a stable arc is immediately established at the arcing tip of the electrode when a high frequency arc or the electrode is touched to the work or auxiliary starting material and withdrawn. Futhermore, the arc remains established at the arcing tip with no wandering up the side of the electrode.

More particularly, it has been found that the above advantages are realized when the tungsten electrode is cored or coated with thoria, ceria or a cesium oxide.

When the tungsten electrode is cored or coated with thoria, ceria or cesia, the welding generator open circuit voltage required for starting the arc is very low, being from 25 volts D.-C. to 35 volts D.-C. as compared to about 190 volts D.-C. when pure tungsten alone is used as the electrode material. More specifically, the open circuit voltage required when using a thoria coated or cored tungsten electrode is about 25 volts D.-C.; using ceria, about 35 volts D.-C., and with cesium oxide, about 35 volts D.-C. This characteristic of the present electrode permits the use of smaller welding generators than would otherwise be required.

The instant starting and stable arc maintenance of the present electrodes is in direct contrast to that of an electrode of tungsten alone. Using a tungsten electrode, even with an impressed starting voltage of 190 volts D.-C. or nearly eight times as great as when the present materials are used, the arc is slow and unsteady in becoming established. Once established, the arc has a tendency to be unstable, and the cathode spot and arc wander about the arcing tip, up the sides of the electrode and onto the metal parts of the welding torch, damaging the latter as well as extinguishing the arc. When the arc is reestablished, the same undesirable cycle of events recurs. This erratic behavior of the arc is annoying in any arc welding and especially so in automatic arc welding, wherein the movement of the torch relative to the work is usually commenced with the striking of the high frequency arc-starting spark. The slow and unsteady establishment of the arc, using a tungsten electrode, results in a blank or unwelded section on the work to be welded. After becoming established, the wandering of the cathode spot and arc results in an irregular and erratic weld which is inferior in holding ability. When the arc wanders up the side of the electrode, not only may the electrode-holding collet be burned and damaged, but the arc is easily extinguished. This leaves another unwelded gap in the work until cathode spot and arc are reestablished. The frequent use of a high frequency spark to restart the arc also results in undesirable interference with radio reception.

A further disadvantage of the plain tungsten electrode is that the tip becomes molten and rounded as the cathode spot wanders about its edges. This melting of the electrode tip and the formation of a globule of molten metal thereon produces a change in the arc gap distance which may cause the arc to extinguish or to produce poor welds. The molten condition of the plain tungsten tip in actual use is also conducive to evaporation of the electrode or even loss of metal by separation or dropping of the molten globule from the electrode. On the other hand, the present electrode is substantially if not wholly non-evaporating. The end of the present electrode being unmelted will further not change its shape as by formation of a molten globule of metal so as to require frequent and annoying adjustment of the arc gap distance. Once the arc gap is fixed, using the present electrode, it remains unchanged.

When thoria, ceria or a cesium oxide are mechancially associated with the tungsten electrode, the disadvantages of the plain tungsten electrode are obviated. When the torch is placed in motion with the application of the high frequency starting spark, there is no blank spot in the work to be welded because the arc and cathode spot are immediately established. Furthermore, once established, the cathode spot and arc remain steady at the arcing terminal of the electrode with no wandering or erratic behavior. The net result, when using the present material with the tungsten electrode, is a steady, uniform weld of high strength which is commenced simultaneously with application of the high frequency spark and continues uninterruptedly until the work and torch are further separated or the current is cut off.

The advantages of the present electrode are further available when hand-held welding torches are used. In those cases in which the high frequency spark is used to start the cathode spot and arc, the procedure is much the same as in the use of the automatic machine as described above. When the arc is started by short circuiting the arc gap, employment of an auxiliary carbon arc starting block or plate is recommended. In using such a block or plate, it is placed immediately adjacent the start of the weld, the electrode being touched to it and withdrawn to establish the arc and the torch and the arc then moved over to the work. Such a method avoids contamination of the material to be welded with electrode material. Thereafter, if the torch is used by an experienced welder, the only occasion for extinguishment of the arc would be a cutting off of the current.

The electrode of the present invention also operates satisfactorily at much lower currents than plain tungsten electrodes. For example, a one-sixteenth inch diameter thoria coated tungsten electrode will start instantly at 6 amperes D.-C. an arc which has excellent stability. Ceria and cesium oxide coated rods are comparable in performance. On the other hand a similar plain tungsten electrode will start a fair though rather unstable arc at only as high as 20 to 30 ampere D.-C. providing small diameter rods are used. The present thoria, ceria or cesium oxides may be applied to the tungsten electrode in any of a number of ways. The powdered material, for example, may be used as a core for a hollow tungsten rod. The material may also be coated on the sides of the electrode in any convenient manner. For example, the electrode may be simply dipped in a slurry or suspension of the material in water, removed and dried. Alcohol or other volatile solvents may be added to the suspension to hasten drying. The material may also be placed in slots provided in the electrode surface. Other combinations will occur to those skilled in the art.

Binders may also be used to cause the stabilizing oxide to adhere more tightly to the electrode. Of all the well known binders used for binding various coatings to welding electrodes, water glass or a water solution of sodium silicate is preferred.

The following will serve as an example of the process of making a coated tungsten electrode and is to be taken as illustrative of, rather than limiting, the process. A coating mixture was prepared by thoroughly mixing together, a ball-mill is suitable, one hundred parts by weight of coating material, thirty parts by volume of water glass, and ten parts by volume of water. A typical analysis of one water glass used was about 9% sodium oxide, 30% silica, and the remainder water.

The tungsten electrodes are dipped momentarily in the above mixture of water glass, stabilizing material and water, removed and treated for up to about one minute at about 1500° C. to form a gray, hard, firmly bound coating several mils thick on the electrode. The baking or firing of the coating may be dispensed with and the coating merely air dried. However, the coating thus obtained is not as durable as that produced by firing when subjected to mechanical handling and thermal shock.

The water glass used as a binding material is not believed to contribute to the advantages of this invention other than to provide a convenient way of holding the stabilizer in place on the electrode, the arcing action of the stabilizer with the above water glass binder being the same as that of stabilizer with no binder at all.

Just enough of the material is required to form a thin film of the oxide over the end of the electrode. Larger amounts may be used without detracting from the results, the only upper limit being that not enough should be used to permit the formation of a melt of the material or material and binder which will drip onto the work and contaminate the latter. For example, in the case of a one-sixteenth inch diameter rod a coating from about one and one-half mils to two and one-half mils thick is suitable while for a one-eighth inch diameter rod a coating from about three to five mils thick is preferred.

In operation, the improved electrode of this invention is used in any conventional inert gas arc welding apparatus, a typical form of which is depicted in the drawing. As shown, tungsten electrode 1 having a coating 2 as described is held in a spring collet 3 which in turn is attached to copper tube 4. Electrode 1 may extend into tube 4 which serves as a means for supplying inert gas, such as argon or helium, about the electrode and also as a conductor for carrying welding current to the electrode 1 through collet 3.

Tube 4 is surrounded by electrically insulating sleeve 5, which in turn is enveloped by a protecting casing 6 of some durable material, such as iron or steel. Nozzle 7 is frictionally engaged with one end of casing 6 and provides a chamber enclosing the end of tube 4 and the collet 3 mounted thereon. Gas supplied through tube 4 flows into the above chamber through a plurality of holes 8 in the side walls of tube 4 and is discharged from nozzle 7 about the arcing terminal of electrode 1.

One terminal of a source of arc welding current is connected by conductor 9 to tube 4, and the other source of supply is connected by conductor 10 to a work supporting table 11. Parts 12 to be welded are supported on this table 11 with their edges adjoining lengthwise.

The advantages attained by the application of this invention do not depend upon any so-called fluxing action, neither the electrode metal nor the material such as thoria, ceria or cesium oxide entering the weld or forming a sheath over it. The only blanketing phenomenon present in welding according to this invention is that of the inert gases fed through the welding torch nozzle which shield the electrode and the molten part of the weld metal. The electrode of this invention may be termed non-consumable in the sense that the electrode metal does not enter the weld.

The presence of the thoria, ceria or cesium oxide enables the cathode spot and arc in inert gas arc welding to become immediately and permanently established on the tip of the tungsten electrode with no wandering up the sides of the electrode or onto other metallic parts of the welding torch or fixture.

What I claim as new and desire to secure by Letters Patent of the United States is:

1. A non-consumable inert gas arc welding electrode of tungsten which has instant arcing starting and stable arc operating characteristics, said tungsten having a core of material selected from the group consisting of thoria, ceria and cesium oxide for forming a stable cathode spot at its arcing terminal.

2. A non-consumable inert gas arc welding electrode of tungsten which has instant arc starting and stable arc operating characteristics, said tungsten electrode including as a part thereof a core of thoria for forming a stable cathode spot at its arcing terminal.

3. A non-consumable inert gas arc welding electrode of tungsten which has instant arc starting and stable arc operating characteristics, said tungsten electrode including as a part thereof a core of ceria for forming a stable arc at its arcing terminal.

4. A non-consumable inert gas arc welding electrode of tungsten which has instant arc starting and stable arc operating characteristics, said tungsten electrode including as a part thereof a core of cesium oxide for forming a stable cathode spot at its arcing terminal.

JAMES D. COBINE.

REFERENCES CITED

The following references are of record in the file of this patent:

UNITED STATES PATENTS

| Number | Name | Date |
| --- | --- | --- |
| 2,473,601 | Labosco | June 21, 1949 |
| 2,515,559 | Lancaster et al. | July 18, 1950 |